Nov. 1, 1932.  F. H. MACNEIL  1,886,346
ELECTRIC SWITCH AND SUPPORTING MECHANISM THEREFOR
Filed Sept. 30, 1930
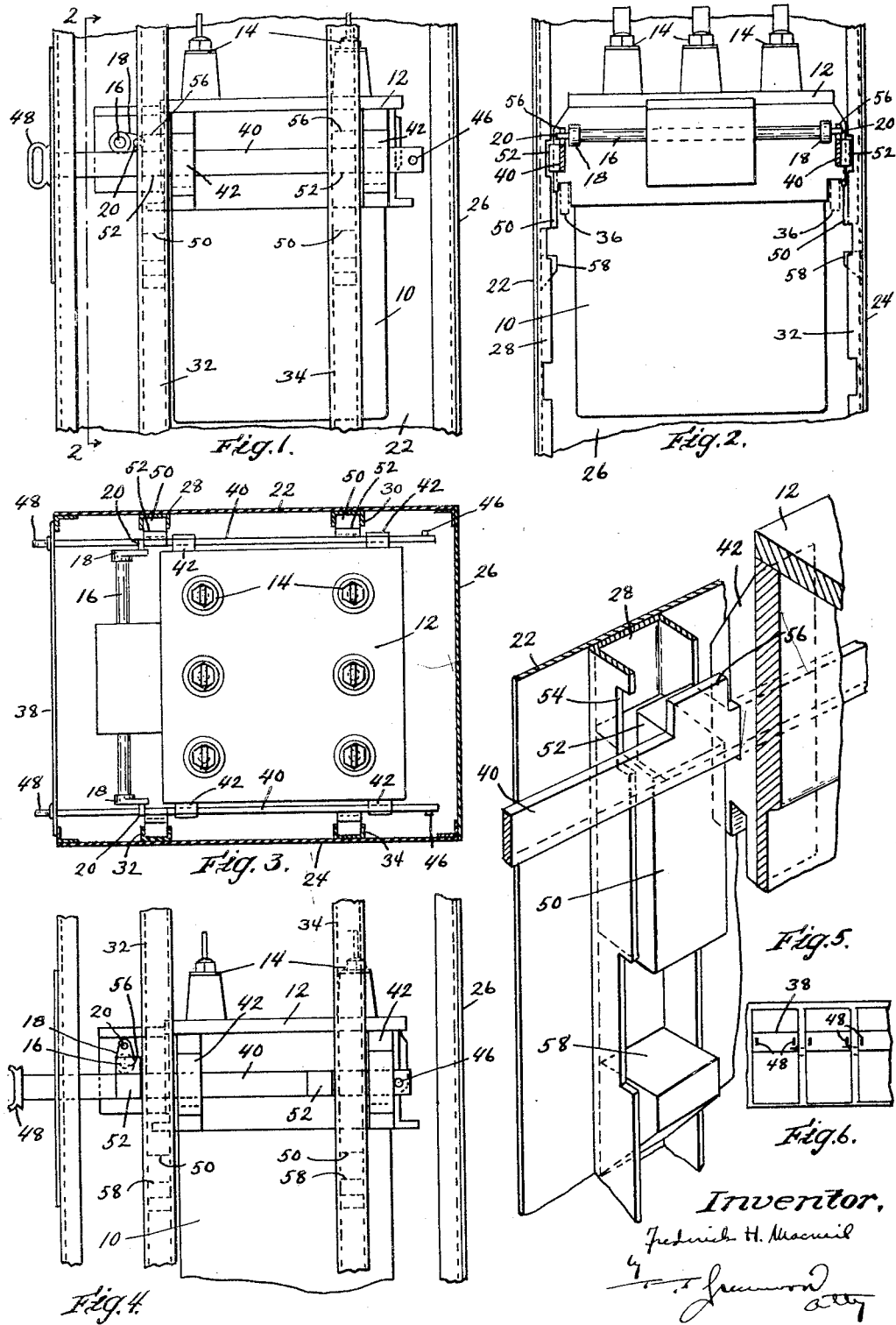
Inventor,
Frederick H. MacNeil Patented Nov. 1, 1932

1,886,346

UNITED STATES PATENT OFFICE

FREDERICK H. MACNEIL, OF BOSTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC SWITCH AND SUPPORTING MECHANISM THEREFOR

Application filed September 30, 1930. Serial No. 485,432.

This invention relates to electric switches or circuit interrupters and their enclosing cells or supporting structures and particularly to improved means for supporting the switch removably in service and test positions within the cell.

The switch with which the present invention is particularly concerned is adapted to be raised and lowered within the cell to cause its stationary switch terminals to be engaged with and disengaged from cooperating line terminals located within the cell structure.

One of the objects of the present invention is the provision of improved means for supporting a switch in service position within the cell with its switch terminals engaged with the line terminals, and with means which prevents the lowering of the switch or interrupter when it is closed and also which prevents the closing of the switch until the switch is fully in service position.

Another object of the present invention is the provision of a switch having switch supporting means that can be withdrawn to permit the switch to be lowered from service position.

A further object of the invention is the provision of a switch having switch supporting bars that are movable into and out of switch supporting position with relation to the enclosing cell, the bars having operating handles that constitute means by which the switch, and a truck on which it is supported when external of the cell, can be moved about.

Another object of the invention is the provision of switch supporting means that cooperates with the cell structure to support the switch in both service and test positions.

Another object is generally to improve the construction of enclosed electric switches.

Fig. 1 is a side elevation through a switch or circuit interrupter and an enclosing cell therefor to which the present invention is applied.

Fig. 2 is a sectional elevation taken along line 2—2 of Fig. 1.

Fig. 3 is a plan view of the switch and its enclosing cell, the cell being shown in section.

Fig. 4 is a view similar to Fig. 1 but with the switch supporting bars withdrawn to a position permitting the switch to be lowered.

Fig. 5 is a perspective detail showing the construction of one of the supporting bars and the cell structure cooperating therewith.

Fig. 6 is a front detail of the cell structure of the switch.

The switch herein shown for illustrating the invention comprises an enclosing casing including an oil receptacle 10 in which the separable contact members of the switch are located and a frame 12 that constitutes a cover for the oil receptacle. The stationary switch terminals 14 are carried by the frame and depend into the oil in the receptacle. The movable contact members, not shown, are adapted to connect the switch terminals under the oil and are operated by a suitable mechanism that includes the operating shaft 16 that is extended horizontally in opposite directions externally of the forward part of the switch casing and has crank arms 18 at its ends which terminate in oppositely extended pins 20. The switch is enclosed within a cell or supporting structure comprising the side walls 22 and 24 and the back wall 26. The cell also has vertical supporting channels 28 and 30 which carry the side wall 22 and which are located adjacent the one side of the switch casing. The cell structure also has similar vertical channels 32 and 34 which carry the side wall 24 and which are located adjacent the other side of the switch casing.

The switch herein shown is movable horizontally into and out of the cell and is also adapted to be raised within the cell into a service position wherein the exposed terminals of its stationary switch members engage line terminals, not shown, carried by the cell structure for the purpose of connecting the switch to its circuit. The switch is also adapted to be lowered into an intermediate or test position where its switch members are disengaged from the line terminals for the purpose of testing the operation of the switch and its associated control accessories. The switch also can be lowered below the test position and withdrawn horizontally from the cell. The raising and lowering of the switch is accomplished by a suitable truck, not herein necessary to describe, and which may have arms 36, see Fig. 2, that can be located under the switch frame, or have parts that engage and support the switch otherwise, to raise and lower the switch when the removable part of the cell door 38 is removed.

In accordance with this invention, improved means are provided for supporting the switch removably in the cell and by the cell structure. Said means includes a pair of horizontal bars 40 which are located on opposite sides of the switch casing and between the casing and the side walls 22 and 24 respectively. Said bars are carried by the switch casing and are slidable horizontally in slots of brackets 42 that are secured to the switch frame. The bars at their rear ends are provided with outstanding pins 46 which engage said brackets 42 when the bars are moved forward sufficiently and thereby limit the forward movement of the bars. The bars extend through slots in the switch-part of the cell door 38 and are terminated in handles 48 exteriorly of the cover by which the bars can be operated. The vertical channels 28 and 30 are provided with supporting blocks 50 that are located within the side flanges thereof and constitute switch supporting shelves. The bar 40 is provided with a pair of laterally extended projections 52 each of which rests upon a separate block or shelf 50 when the bar is in its rear position, thereby providing a support for the switch. The arrangement is the same with respect to the bar 40 and the channels 32 and 34. The forward side flanges of the channels 28 and 30 are provided with recesses 54 that clear the projections 52 so as to permit the bars 40 to be moved forwardly into a position beyond the channels where the projections are clear of the shelves 50. The projections 52 are adapted to engage the rear side flanges of the channels to limit the rearward movement of the bars. The bars may also be provided at their forward ends with upwardly extended projections 56 that engage the brackets 42 and limit the rearward movement of the bars, although said projections have another function as is explained below. The vertical channels are also provided with other blocks 58 which are located vertically beneath the blocks 50 and constitute shelves which support the switch in test position.

In the operation of the device, the lower portion of the cell door 38 is removed or swung aside and a truck is run into the cell either to dispose its arms 36 in engagement with the switch frame or to engage the switch in some other way. The truck is then operated to raise the switch slightly and thereby support it independently of the bars. The bars 40 are then pulled forwardly as far as they will go so that the extensions 52 are at one side of the channels and the supporting shelves 50. The truck is then operated to lower the switch. If it is desired to test the switch, the switch can be lowered to a test position and the bars 40 are moved rearwardly to position the projections 52 above the test shelves 58. The truck is then operated to lower the switch upon the projections where the switch is supported in test position. The switch can be withdrawn from service position by raising it slightly to remove the weight of the switch from the bars so that the bars can again be moved forwardly to clear the shelves 58 whereby the truck can be lowered completely and removed from the cell on the truck. The handles 48 of the bars 40 are located at a convenient height to be engaged to move the truck with the switch thereon into some desired position.

It is undesirable to move the switch into service position when it is closed or to remove the switch from such position when it is closed. To this end, the upstanding projections 56 of the bars 40 cooperate with the pins 20 of the operating shaft 16. When the bars 40 are completely in switch supporting position, the projections 56 are in the rear of the pins so that the shaft can be rotated from the switch closed position of the switch shown in Fig. 1 to the switch open position shown in Fig. 4. When the switch is in closed position, the pins constitute abutments that prevent the bars from being moved forwardly. When the switch is in open position and the bars are withdrawn from holding position, the upstanding projections 56 are disposed in the path of switch closing movement of the pins and thereby prevent the switch from being closed. The switch can be closed only when the bars are fully in their rearmost and switch supporting position which is either in service or test position, since the forward flanges of the channels 28 are continuous between the openings corresponding to such positions and thus hold the bars in withdrawn position where they lock the switch open anywhere between service and test positions and also anywhere below test position.

The normal weight of the switch on the bars is sufficient to prevent the bars from being pulled out of supporting position.

I claim:

1. The combination of an electric switch, a supporting structure therefor, and a switch supporting bar carried by the switch and interposed between said switch and said structure and upon which said switch rests, said bar having a part which rests upon said structure and said bar being movable relatively to the switch into and out of supporting engagement with said structure.

2. The combination of an electric switch, a supporting structure therefor having a shelf, and a movable switch supporting bar carried by said switch and interposed between said shelf and said switch and having a part which is movable relatively to said switch into and out of engagement with said shelf by movements of said bar.

3. The combination of an electric switch, a supporting structure therefor having shelves on opposite sides of the switch, and supporting bars carried by and located on opposite sides of the switch and having parts which are supported upon said shelves, said bars being movable to position said parts into and also out of cooperative relation with said shelves.

4. The combination of an electric switch having operating mechanism, a supporting structure for the switch, a switch supporting bar which is carried by the switch and is interposed between said switch and said supporting structure and which is movable relatively to the switch into and out of supporting position with respect to said structure, and means governed by said operating mechanism which prevents movement of said bar when said operating mechanism is in a predetermined position.

5. The combination of an electric switch having operating mechanism, a supporting structure for the switch, a switch supporting bar carried by said switch which is interposed between said switch and said supporting structure and which is movable relatively to the switch into and out of supporting position with respect to said structure, and means associated with the switch mechanism and interposed between said switch mechanism and said bar which prevents movement of said switch mechanism in a predetermined direction when said bar is in a predetermined location.

6. The combination of an electric switch having a supporting frame, a supporting structure for the switch, and a switch supporting bar slidably carried by said switch frame and adapted to rest upon said supporting structure.

7. The combination of an electric switch having a switch frame, a supporting structure for the switch, and a switch supporting bar slidably carried by said switch frame and adapted to rest upon said supporting structure, said bar being movable into and out of supporting position with respect to said supporting structure.

8. The combination of an electric switch having a switch frame, switch supporting bars located on opposite sides of the switch frame and carried slidably thereby, and a supporting structure for the switch having shelves upon which said bars are adapted to rest whereby to support the switch upon said structure, said bars being movable into and out of supporting engagement with said shelves.

9. The combination of an electric switch having a switch frame, switch supporting bars located on opposite sides of the switch frame and carried slidably thereby, and a supporting structure for the switch having shelves upon which said bars are adapted to rest whereby to support the switch upon said structure, said bars being movable into and out of supporting engagement with said shelves, and stop members which engage with said switch frame and limit movement of said bars in opposite directions.

10. The combination of an electric switch, a supporting structure therefor having shelves, and a switch supporting bar carried slidably by said switch and having lateral extensions which are adapted to rest upon said shelves, said bar being movable in the direction of its length to move said extensions into and out of supporting position above said shelves.

11. The combination of an electric switch and a supporting structure therefor having shelves that are disposed on opposite sides of the switch, and switch supporting bars carried by said switch on opposite sides thereof and having lateral projections which are adapted to be supported upon said shelves, said bars being movable in the direction of their lengths to move said projections into and out of a supporting relation with said shelves.

12. The combination with an electric switch, a supporting structure having vertically-disposed switch-supporting shelves, and a switch supporting bar carried movably by said switch and having a part that is adapted to rest upon either one of said shelves.

13. The combination of an electric switch, a supporting structure therefor having a pair of vertically-spaced aligned shelves, and a switch-supporting bar carried movably by said switch and having a projection which is adapted to rest upon either one of said shelves, said bar being movable in the direction of its length to move said projection into and out of the line of said shelves.

14. The combination of an electric switch having switch operating mechanism, a supporting structure for the switch, a supporting bar carried slidably by the switch having a part which is movable by movements of said bar into and out of cooperative relation with said supporting structure, and said switch mechanism having cooperating parts which are in opposition at predetermined positions of said bar and switch mechanism by which one governs the operation of the other.

15. The combination of an electric switch having switch operating mechanism including an operating shaft, an arm fixed to said shaft, a supporting structure for the switch having a shelf, a switch supporting bar carried slidably by the switch having a lateral projection which is movable with said bar into and out of cooperative relation with said shelf and having a control projection which is located beneath and in engagement with said arm in one position of said arm whereby to hold the switch from operation in one direction and which is located in the rear of said arm in another position of the bar whereby said arm holds the bar against movement.

16. The combination of an electric switch and an enclosing cell therefor having a door behind which the switch is located, said cell having switch supporting shelves on opposite sides of the switch and said switch carrying horizontally-movable switch-supporting bars that have lateral extensions that rest upon the shelves, said bars being movable horizontally into positions where the projections are free from engagement with said shelves and said bars having operating handles which are located externally of the cell.

In testimony whereof, I have signed my name to this specification.

FREDERICK H. MACNEIL.